United States Patent
Delecroix

(10) Patent No.: US 7,120,975 B2
(45) Date of Patent: Oct. 17, 2006

(54) METHOD OF FABRICATING A HELICAL TWO-DIMENSIONAL FIBER SHEET

(75) Inventor: Vincent Delecroix, Millery (FR)

(73) Assignee: Messier-Bugatti, Velizy Villacoublay (FR)

( * ) Notice: Subject to any disclaimer, the term of this patent is extended or adjusted under 35 U.S.C. 154(b) by 308 days.

(21) Appl. No.: 10/871,777

(22) Filed: Jun. 18, 2004

(65) Prior Publication Data

US 2005/0235471 A1    Oct. 27, 2005

(30) Foreign Application Priority Data

Apr. 23, 2004    (FR) ................................. 04 04310

(51) Int. Cl.
*D04H 3/05* (2006.01)

(52) U.S. Cl. .............................. 28/101; 28/103; 28/107

(58) Field of Classification Search ................... 28/101, 28/102, 107, 100, 103, 109, 108, 110, 111–115, 28/143, 142; 264/258; 156/148, 184, 177, 156/178, 181, 440; 442/381, 387, 388; 428/36.3, 428/222; 112/420, 475.08, 475.01; 138/123, 138/124, 129, 141, 144
See application file for complete search history.

(56) References Cited

U.S. PATENT DOCUMENTS

| | | | |
|---|---|---|---|
| 4,080,232 A * | 3/1978 | Friedrich ..................... 156/177 |
| 4,790,052 A | 12/1988 | Olry | |
| 5,217,770 A * | 6/1993 | Morris et al. .............. 428/36.3 |
| 5,242,745 A | 9/1993 | Aucagne et al. | |
| 5,546,880 A * | 8/1996 | Ronyak et al. ........ 112/475.01 |
| 5,662,855 A | 9/1997 | Liew et al. | |
| 5,792,715 A | 8/1998 | Duval et al. | |
| 5,876,322 A | 3/1999 | Piramoon | |
| 6,009,605 A | 1/2000 | Olry et al. | |
| 6,105,223 A | 8/2000 | Brown et al. | |
| 6,347,440 B1 * | 2/2002 | Duval et al. .................. 28/107 |
| 6,363,593 B1 | 4/2002 | Duval et al. | |
| 6,367,130 B1 | 4/2002 | Duval et al. | |
| 2001/0006866 A1 | 7/2001 | Kurioiwa et al. | |
| 2005/0076995 A1 * | 4/2005 | Yasui ......................... 156/148 |
| 2005/0172465 A1 * | 8/2005 | Duval ......................... 28/101 |

FOREIGN PATENT DOCUMENTS

| | | |
|---|---|---|
| EP | 0 232 059 | 8/1987 |
| EP | 0 683 261 A2 | 11/1995 |
| FR | 2 490 687 A | 3/1982 |
| FR | 2 839 985 A | 11/2003 |
| WO | WO 98/49382 | 11/1998 |

* cited by examiner

*Primary Examiner*—Amy B. Vanatta
(74) *Attorney, Agent, or Firm*—Weingarten, Schurgin, Gagnebin & Lebovici LLP

(57) ABSTRACT

A transverse fiber sheet is lapped by being guided in a substantially radial direction back and forth along a path between circumferentially outer and inner edges of the sheet, with the transverse sheet being reversed at each end of its path, the width of the transverse sheet being narrowed between the outer circumferential edge and the inner circumferential edge, the transverse sheet being held in place as it is lapped. Substantially mutually parallel yarns or tows are pulled to form a helical longitudinal sheet of density per unit area that decreases between its outer edge and its inner edge. The transverse sheet and the helical longitudinal sheet are superposed and advance continuously in flat rotation, and they are assembled together to form a helical two-dimensional sheet which is removed.

40 Claims, 12 Drawing Sheets

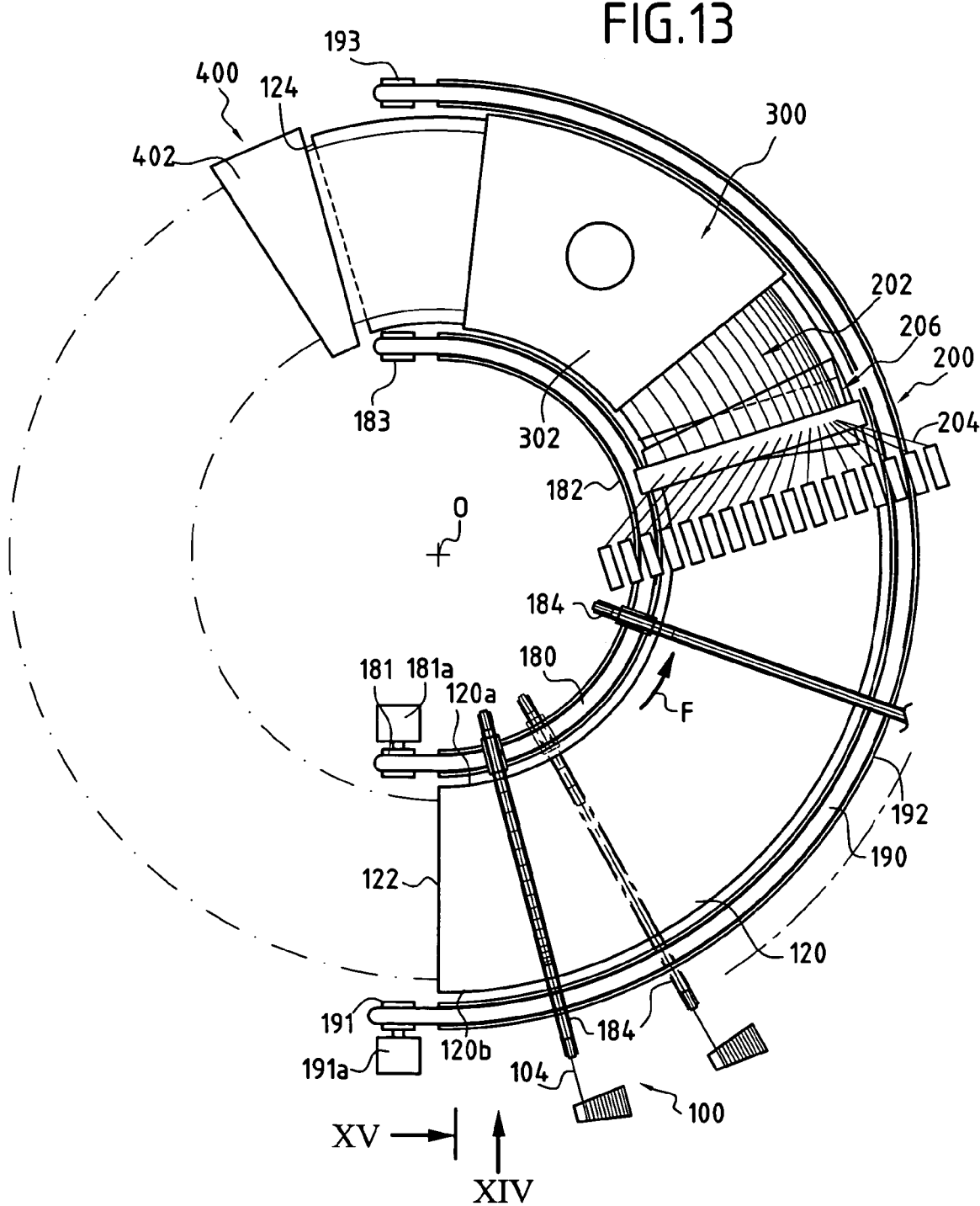

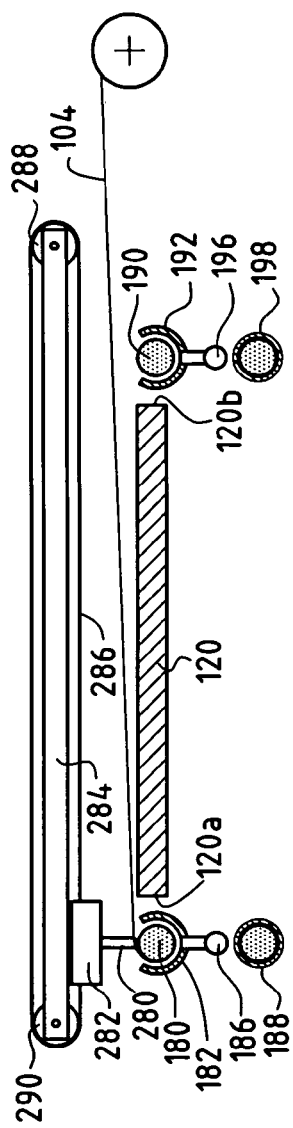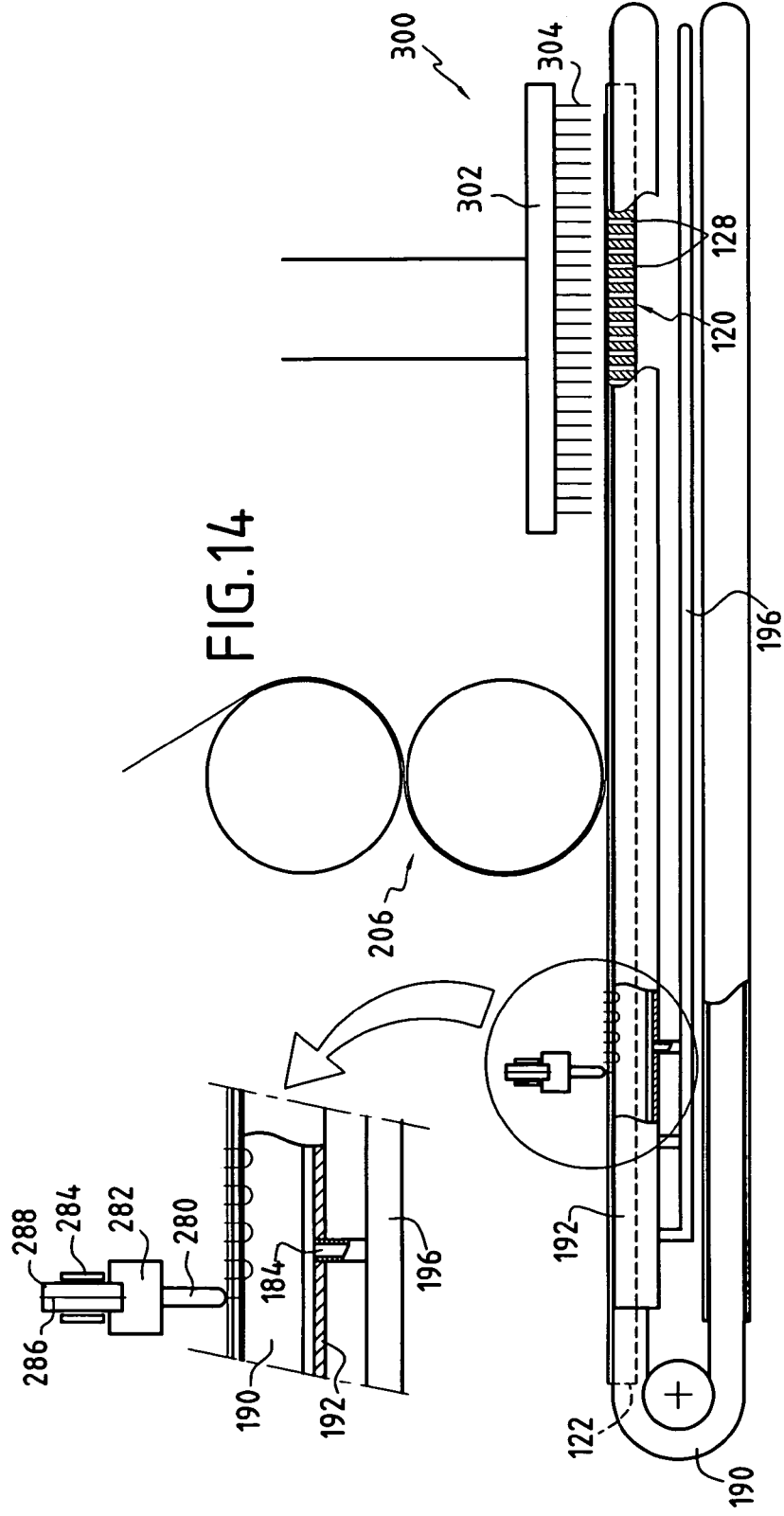
FIG. 15
FIG. 14

METHOD OF FABRICATING A HELICAL TWO-DIMENSIONAL FIBER SHEET

This application claims priority to a French application No. 04 04310 filed Apr. 23, 2004.

BACKGROUND OF THE INVENTION

The invention relates to fabricating a helical two-dimensional fiber sheet.

A particular field of application of the invention is fabricating helical fiber sheets for making annular three-dimensional fiber structures, such as reinforcing fiber structures for annular parts made of composite material, in particular brake disks.

Brake disks made of composite material, in particular of composite material comprising carbon fiber reinforcement and a carbon matrix (carbon/carbon or C/C composites) or having a carbon fiber reinforcement with a matrix that is at least in part made of ceramic (carbon/ceramic composites or C/C-ceramic composites), are well known. Fabricating them comprises making an annular fiber preform and then densifying it with a matrix, densification being obtained using a liquid method (impregnating with a resin that constitutes a precursor for the matrix, followed by pyrolyzing the resin), or by a gas method (chemical vapor infiltration).

The fiber preform is usually made by stacking fiber plies and bonding the plies to one another, typically by needling.

The annular shape of the preform may be obtained by cutting out from a block made up of fiber plies stacked on one another and bonded together, or by stacking fiber plies that are of annular shape and that have been cut out from two-dimensional fabrics (woven cloth, one-directional or multi-directional fiber sheets, felts, . . . ). This leads to considerable amounts of scrap material. The amount of scrap can be reduced by making plies that are annular by juxtaposing ring sectors cut out from a two-dimensional fabric, but that is at the price of an implementation that is more complex. Reference can be made in particular to the following documents: U.S. Pat. Nos. 4,790,052, 5,792,715, and EP 0 232 059.

Methods have been proposed enabling an annular preform to be obtained having the desired shape with practically no scrap material, such methods consisting in winding a helical fiber fabric with turns that are superposed flat, which turns are bonded to one another, in particular by needling. Such methods making use of a deformable helical sheet or of flattened helical braids are described in particular in documents U.S. Pat. No. 6,009,605 and No. 5,662,855. Reference can also be made to documents U.S. Pat. No. 6,363,593 and No. 6,367,130 which relate to an installation for making such annular fiber preforms from helical two-dimensional fabrics.

Those methods for obtaining annular fiber preforms require helical braids or woven sheets to be made by methods that are relatively expensive.

Proposals have been made in document WO 98/49382 to make a thick annular fiber preform directly from free fibers without going via a step of fabricating fiber fabrics, in particular by lapping a set of free fibers in the radial direction across a bed of disordered free fibers moved into the circumferential direction, the fibers being bonded by needling. Apart from the fact that the description is practically silent about the way in which the bed of disordered fibers is made and the way in which the radial free fibers are deposited, it can immediately be seen that it is practically impossible to obtain a fiber preform that does not present a high degree of non-uniformity in thickness and in fiber density.

OBJECT AND SUMMARY OF THE INVENTION

An object of the present invention is to remedy the drawbacks of the prior art methods by proposing a method of fabricating a helical fiber fabric making it possible in particular to make thick annular fiber structures in simplified manner and at relatively low cost, while also minimizing the amount of scrap material and non-uniformities in density and in thickness.

This object is achieved by a method comprising the following steps:

bringing at least one transverse fiber sheet and lapping it while guiding it in a substantially radial direction along a path in alternating directions between inner and outer circumferential edges of the sheet, with the transverse sheet being reversed at each end of its path, the width of the transverse sheet being narrowed between the outer circumferential edge and the inner circumferential edge;

holding the transverse sheet as it is lapped;

pulling a plurality of substantially mutually parallel yarns or tows to form a helical longitudinal sheet with the density per unit area of the longitudinal sheet decreasing from its longitudinally outer edge to its longitudinally inner edge;

superposing the helical longitudinal and transverse sheets and advancing them flat in continuous rotation;

assembling together the lapped transverse sheet and the longitudinal sheet to form a helical two-dimensional sheet; and removing the helical two-dimensional sheet formed in this way.

The method of the invention is remarkable in that it makes it possible by a technique of the lapping type to obtain a two-dimensional sheet that is helical. Manufacturing costs are lower than with weaving and braiding techniques. The resulting helical sheet can then be used directly to obtain an annular fiber structure by superposing the turns flat. The use of a sheet then makes it possible to reduce irregularities in thickness due to yarns crossing over, in comparison with fabrics that are woven or braided.

The longitudinal sheet is preferably brought onto the lapped transverse sheet immediately before the two sheets are assembled together, with the yarns of the helical longitudinal sheet thus being held in position relative to the lapped transverse sheet by the two sheets being assembled together.

The transverse sheet may be made up of a plurality of yarns or tows or of at least one spread tow.

Advantageously, while the transverse sheet is being lapped it is guided by passing over a guide so as to encourage narrowing of the sheet while the guide is moving from the outer edge towards the inner edge of the sheet, and vice versa.

Advantageously, the guide comprises two curved bars against which the transverse sheet bears in alternation while the guide is being moved in one direction and in the opposite direction between the outer and inner edges of the sheet.

When the transverse sheet is made up of a plurality of yarns or tows, each yarn or tow is also guided between fixed guide elements extending substantially radially between the outer and inner circumferential edges of the sheet.

When the sheet is made up of at least one spread tow, the transverse sheet is also preferably guided between two stationary guide elements extending substantially radially between the outer and inner circumferential edges of the sheet.

In a variant, when the transverse sheet is made up of a plurality of yarns or tows, each yarn or tow may be guided by passing through a respective yarn guide that is moved between the outer and inner circumferential edges.

Advantageously, after lapping, the transverse sheet is held, where it reverses, on supports situated along the outer and inner edges of the sheet, which supports are moved synchronously with the advance of the lapped transverse sheet and of the longitudinal sheet.

Retention may be provided in particular by suction on said supports or by passing around pegs carried by said supports.

The variation in the density per unit area of the helical longitudinal sheet may be obtained by using yarns or tows of different weights and/or by varying the spacing between the yarns or tows, whereas the longitudinal yarns or tows may be pulled by passing them through a press comprising two conical rollers pressing against each other.

Various means can be used for assembling together the longitudinal and transverse sheets, such as needling, stitching with a bonding yarn, or interposing hot-melt yarns.

The transverse and longitudinal sheets may be brought onto a stationary annular support plate, which is advantageously in the form of a annular sector with a downstream end situated downstream from a zone for assembling together the longitudinal and transverse sheets, in the direction of advance. The helical two-dimensional sheet is then removed from an outlet from the annular support plate that is situated at the downstream end thereof. Advantageously, the helical two-dimensional sheet as removed in this way is wound helically with turns that are superposed flat in a rotary annular storage drum situated beneath the annular support plate and having substantially the same axis as the plate.

In a variant, the lapped transverse sheet and the longitudinal sheet may be brought onto a rotary annular support. The helical two-dimensional sheet may then be removed laterally relative to the annular support plate.

Another object of the invention is to provide an installation enabling the above-defined methods to be implemented.

According to the invention, such an installation comprises:
  an annular support plate;
  a feed and transverse lapping device for moving a fiber sheet transversely along a back-and-forth path from one side to the other of the annular support plate with the transverse sheet being reversed at each end of the path and with the sheet being guided in a substantially radial direction;
  means for holding the lapped transverse sheet;
  a device for pulling a set of yarns or tows to form a helical longitudinal sheet and for feeding it onto the annular support plate;
  a device for assembling together the lapped transverse sheet and the longitudinal sheet to form a helical two-dimensional sheet;
  means for continuously advancing the lapped transverse sheet and the longitudinal sheet in flat rotation on the annular support plate; and
  means for removing the helical two-dimensional sheet after the longitudinal and transverse sheets have been assembled together.

Advantageously, the device for feeding and lapping the transverse sheet comprises a guide over which the transverse sheet passes, and means for driving the guide in reciprocating motion along a substantially radial path between the sides of the annular support plate, the guide being made in such a manner as to encourage narrowing of the transverse sheet while the guide is moving from the outside of the annular plate towards the inside, and vice versa. Also advantageously, the guide comprises two curved bars against which the transverse sheet bears in alternation when the guide is moved in one direction and in the other direction between the outer and inner sides of the annular plate.

When the transverse sheet is made up of a plurality of transverse yarns or tows, the feeding and lapping device preferably further comprises a plurality of stationary guide elements disposed radially between the outer and inner sides of the annular plate and co-operating with the transverse yarns or tows to guide each of them on its path between the outer side and the inner side of the annular support plate. However, when the transverse sheet is made up of at least one spread tow, the feeding and lapping device preferably further comprises two stationary guide elements disposed radially between the outer and inner sides of the annular support plate, and between which the transverse sheet is guided on its path between the outer side and the inner side of the annular support plate.

In a variant, when the transverse sheet is made up of a plurality of transverse yarns or tows, the feeding and lapping device may comprise a plurality of yarn guides each associated with a respective transverse yarn or tow, and means for displacing the yarn guides back and forth along substantially radial paths between the outer and inner sides of the annular support plate.

Advantageously, the means for holding the lapped transverse sheet comprise supports in the form of bands or rings situated on either side of the annular support plate, holding means for holding the transverse sheet on said support where the sheet reverses, and means for driving said supports synchronously with the advance means.

In an embodiment, the holding means comprise a suction chamber associated with the supports in the form of bands or rings in order to hold the transverse sheet thereagainst by suction.

In another embodiment, the holding means comprise pegs carried by supports in the form of bands, so as to enable the transverse sheet to be reversed around the pegs.

The device for pulling the longitudinal sheet may comprise a press formed by two conical rollers with the yarns or tows forming the longitudinal sheet passing between them.

The device for assembling together the longitudinal sheet and the lapped transverse sheet may be a needling device comprising at least one needling head and extending over an annular sector above the annular support plate, which is provided with perforations in register with the needles of the needling device.

In a variant, the device for assembling the longitudinal sheet and the lapped transverse sheet together may comprise at least one stitching head for assembling the sheets together by means of a bonding yarn.

The advance means may comprise drive means for driving the helical two-dimensional sheet in the advance direction, the drive means being located downstream from the assembly device.

The annular support plate may be stationary and extends over an annular sector having a downstream end in the advance direction of the longitudinal sheet and the lapped transverse sheet, said downstream end being situated downstream from the device for assembling the sheets together. In which case, the means for removing the helical two-dimensional sheet may comprise an annular drum situated beneath the annular support plate and having substantially the same axis as the support plate, and means for driving the annular drum synchronously with the advance means so that the helical two-dimensional sheet leaving the annular support plate from its downstream end is continuously collected and wound in the drum.

The annular support plate may also be rotary, in which case it may present a top portion presenting a brush of rigid bristles.

BRIEF DESCRIPTION OF THE DRAWINGS

Other features and advantages of the method of the invention will appear on reading the following description given by way of non-limiting indication and with reference to the accompanying drawings, in which:

FIG. 13 is a diagrammatic plan view of another embodiment of an installation enabling a method of the invention to be implemented;

FIG. 14 is a more detailed fragmentary view in side elevation seen looking along arrow XIV of FIG. 13;

FIG. 15 is a more detailed fragmentary view in section on plane XV of FIG. 13, showing how the sheet of transverse yarns is lapped;

DETAILED DESCRIPTION OF EMBODIMENTS

Figure 1:
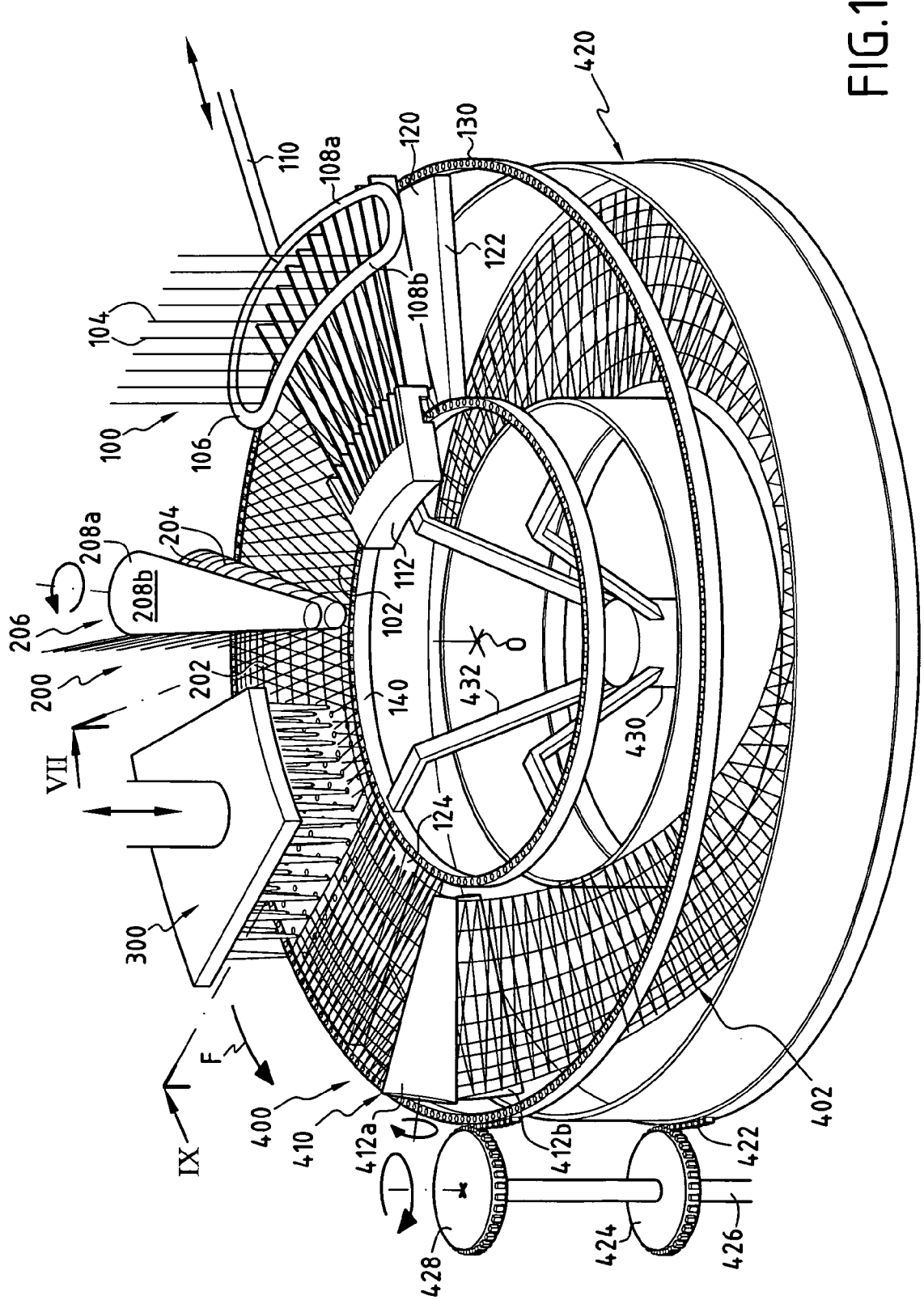
FIG. 1 is a highly diagrammatic overall view in perspective of an installation for implementing a method of the invention.

In general (FIG. 1), a special installation enabling a method of the invention to be implemented comprises a device 100 for forming a transverse sheet 102 lapped on a stationary horizontal annular support plate 120, a device 200 for pulling and depositing a helical sheet 202 made up of longitudinal yarns or tows 204 on the support plate 120, a device 300 for assembling together the lapped transverse sheet 102 and the longitudinal sheet 202 while they are on the plate 120, and a device 400 for removing the resulting annular two-dimensional helical sheet 400 from the plate 120 at the outlet from the assembly device. The transverse sheet and the longitudinal sheet deposited on the plate 120, and also the resulting two-dimensional helical sheet 402 are moved in continuous rotation on the plate 120 about its center (arrow F). Drive is provided by a puller device 410 comprising a pair of conical rollers 412*a*, 412*b*, at least one of which is motor-driven, situated downstream from the assembly device, the two-dimensional helical sheet being pulled by passing between the rollers 412*a*, 412*b* which are pressed against each other.

Forming the Transverse Sheet

The sheet 102 is formed by lapping transverse yarns or tows 104 fed onto the support plate 120. The plate 120 is in the form of a annular sector of center O. By way of example, it is constituted by a smooth metal table. The elements 104 are referred below as yarns for the sake of simplicity. The yarns 104 are preferably of the same weight and they are preferably fed with the same mutual spacing.

The yarns 104 are of a material that is selected as a function of the use for which the two-dimensional helical sheet that is to be made is intended. In an application to making reinforcing fabrics, or preforms, for C/C composite material parts or carbon/ceramic or C/C-ceramic composite material parts, the yarns 104 are commercially available carbon yarns such as 12K (12,000 filaments), 24K, 50K, or 80K yarns.

Each of the transverse yarns 104 forming the transverse sheet 102 is taken from a respective bobbin carried by a creel (not shown). The yarns 104 arrive substantially parallel to one another at a guide frame 106. The yarns 104 are fed, e.g. substantially vertically over the middle radius of the plate 120 and they are deflected horizontally by the frame 106.

The frame 106 is secured to a rod 110 which is moved horizontally back and forth in a radial direction under drive from a drive member such as an actuator (not shown). The frame 106 thus executes reciprocating motion in radial translation between an outer ring 130 and an inner ring 140 extending along the outer and inner edges of the support plate 120, but forming complete rings around the center O.

The frame 106 is disposed substantially horizontally parallel to the support plate 120, and has two opposite sides formed by curved bars 108*a*, 108*b*. While the frame 106 is being moved radially inwards, i.e. towards the inner ring 140 (or towards the inside edge of the transverse sheet), the yarns 104 press against the convex profile of the bar 108*a*, thus encouraging the sheet 102 to become narrower. Conversely, while the frame is moving radially outwards, i.e. towards the outer ring 130 (or the outer edge of the transverse sheet), the yarns 104 bear against the concave profile of the bar 108*b*, thereby encouraging the sheet 102 to become wider. The bars 108*a* and 108*b* could be given different amounts of curvature corresponding substantially to the curvature of the rings 140 and 130 respectively, or the same amount of curvature, e.g. corresponding to the mean curvature between the rings 140 and 130.

Figure 3:
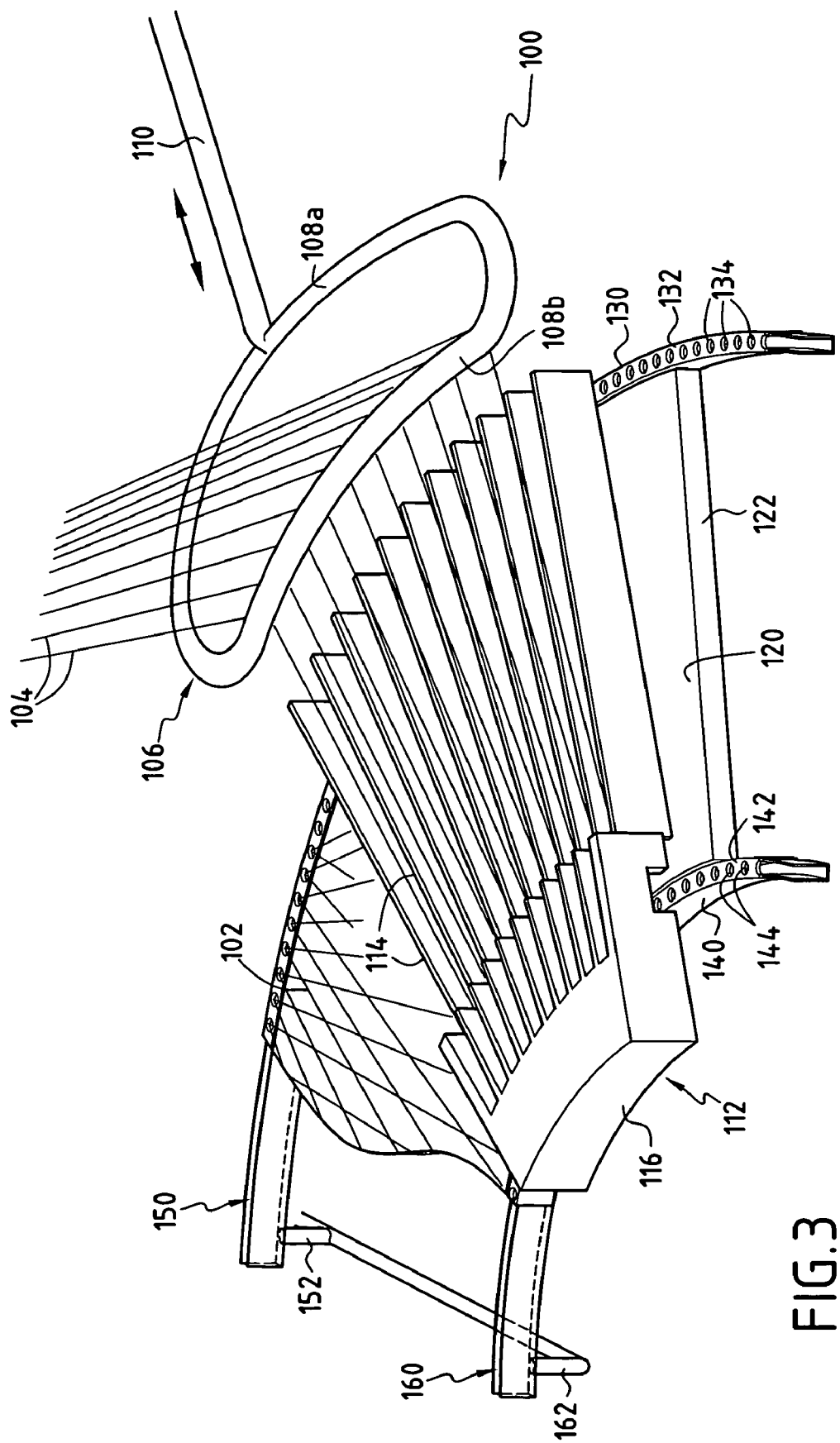
FIG. 3 is a fragmentary perspective view in greater detail showing how the transverse yarns are fed and how they are held at the edges of the sheet of longitudinal yarns.
Figure 7:
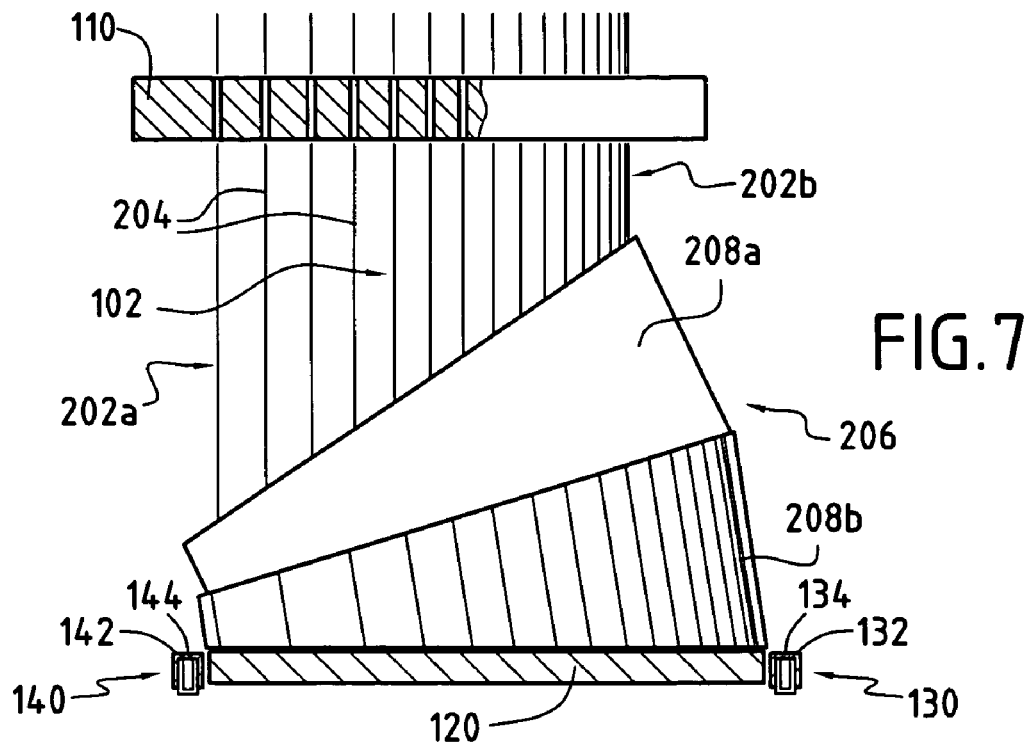
FIG. 7 is a fragmentary view in radial section on plane VII of FIG. 1 showing in greater detail how the sheet of longitudinal yarns is fed in the installation of FIG. 1.

As shown in particular in FIGS. 3 and 7, the outer ring 130 is constituted by a downwardly open channel-section bar whose top wall or web 132 is provided with perforations 134. Similarly, the inner ring 140 is formed by a downwardly channel-section bar whose top wall or web 142 is provided with perforations 144. The rings 130 and 140 are turned synchronously with the advance of the sheet on the support 120, as is described below. The surfaces of the webs 132, 142 and of the support plate 120 are substantially coplanar.

A stationary suction chamber 150 (FIG. 3) of annular shape extends between the flanges of the outer ring 130 over an annular sector extending from an upstream end situated upstream from the zone in which the transverse yarns 104 are lapped to a downstream zone situated downstream from the upstream end of the zone in which the longitudinal and transverse sheets are assembled together (where the terms "upstream" and "downstream" are used herein relative to the direction of advance of the two-dimensional sheet that is being formed).

The chamber 150 thus extends not only over the entire length of the zone in which the yarns 104 are lapped on and over the zone in which the longitudinal sheet 102 is deposited, but also over at least a fraction of the assembly zone. The chamber 150 is defined by side walls adjacent to the flanges of the ring 130, a bottom wall, and end walls at its upstream and downstream ends, and it is open on top in register with the perforated wall 132 of the ring 130.

In similar manner, a stationary suction chamber 160 of annular shape extends between the flanges of the inner ring 140 over substantially the same annular sector as the chamber 150. The chamber 160 is defined by side walls adjacent to the flanges of the ring 140, a bottom wall, and upstream and downstream end walls, and it is open in register with the perforated wall 142 of the ring 140.

The chambers 150 and 160 are connected to a vacuum source (not shown) by pipes 152, 162 that open out into the bottoms of the chambers.

A stationary guide comb 112 comprises a set of blades 114 which extend radially immediately above the support plate 120, and the rings 130 and 140. On the inside, the blades 114 forming the teeth of the comb are united by a strip 116 that is secured to a stationary support (not shown).

In operation, as the guide frame 106 moves towards the inner ring 140, the transverse yarns 104 are moved towards one another by sliding over the curved bar 108a while also being guided by the vertical side faces of the blades 114 of the comb 112. While the guide frame 106 is moving towards the outer ring 130, the transverse yarns are moved apart from one another by sliding on the curved bar 108b, and while still being guided by the vertical side faces of the blades 114 of the comb 112. Where they are turned around at the ends of the stroke of the guide frame 106, the transverse yarns are held by suction to the rotary rings 130 and 140 on either side of the edges of the plate 120.

In the example shown, the guide 106 is moved immediately above the comb 112. In a variant, the guide 106 may be moved in a space provided between the support plate 120 and the comb 112.

The transverse yarns 104 are lapped with continuous and synchronized advance of the lapped transverse sheet 102, of the longitudinal helical sheet 202, and of the rings 130 and 140, so the transverse yarns 104 are deposited in directions that are not radial, with the yarns 104 crossing over one another and also over the longitudinal yarns 104 (FIG. 1).

Figure 4:
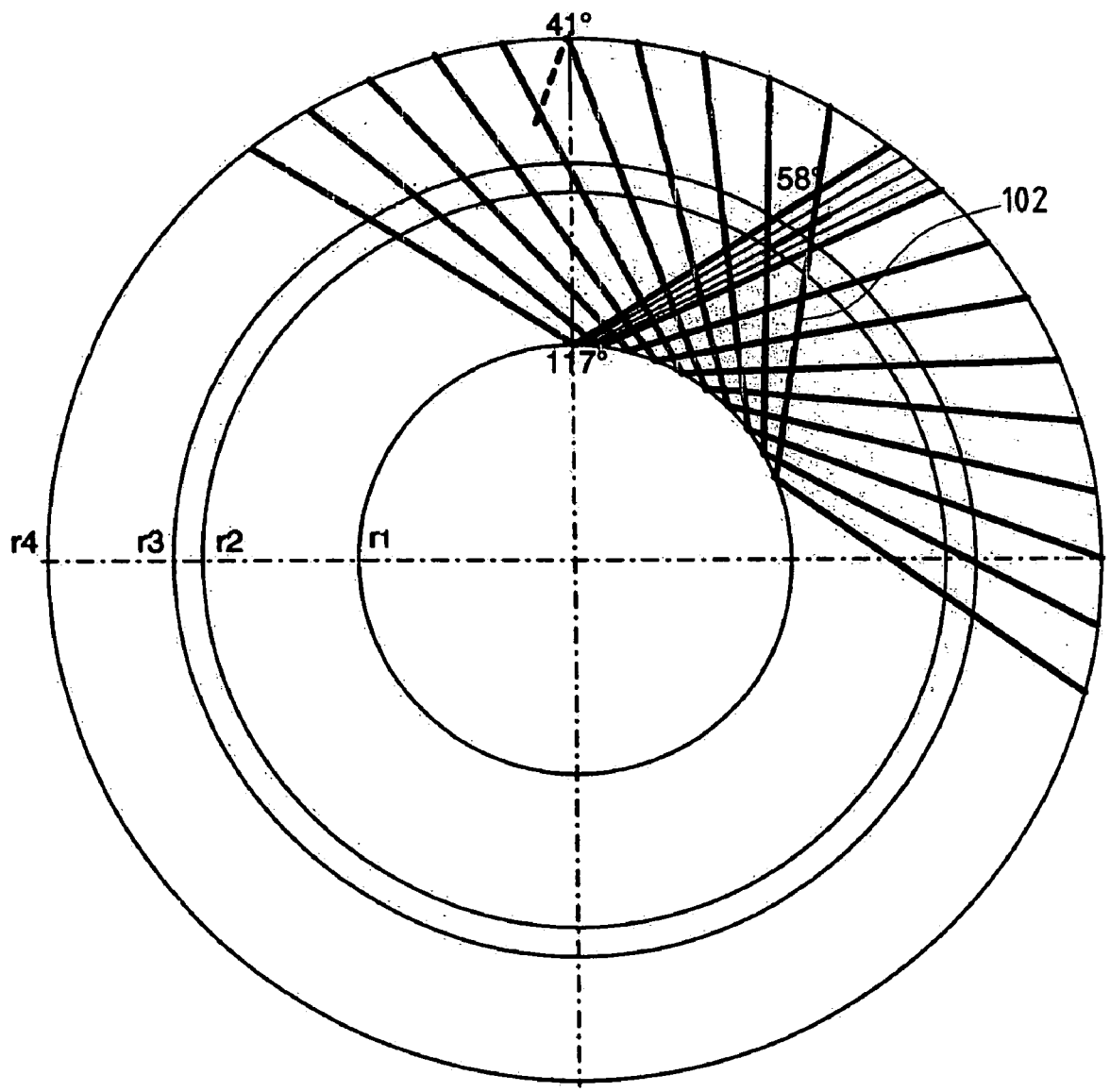
FIG. 4 is a diagrammatic view showing the orientations of the yarns of the transverse sheet after it has been lapped.

FIG. 4 shows an example of the way in which ten yarns are lapped transversely. It can be seen that the angle between the lapped transverse yarns varies, increasing from the outer circumferential edge (radius $r_4$) to the inner circumferential edge (radius $r_1$) of the sheet. The radius $r_2$ is the middle radius, while the line corresponding to the radius $r_3$ separates the annular sheet in two parts of same surface. In order to obtain a two-dimensional sheet that is as uniform as possible, it is advantageous to ensure that the transverse yarns cross so as to form an angle that is close or approximately equal to 60° at the circumference of radius $r_3$ so that, at this position, the transverse yarns and the longitudinal yarns are oriented in a 3×60° configuration. This can be adjusted by varying the speed of advance of the sheet over the support plate 120 and the speed at which the transverse yarns are fed for given dimensions of the helical sheet. In the example shown, the angle formed by the transverse yarns varies over the range 41° to 117° between the outer and inner circumferences, and it is equal to 58° at the circumference of radius $r_3$.

Figure 5:
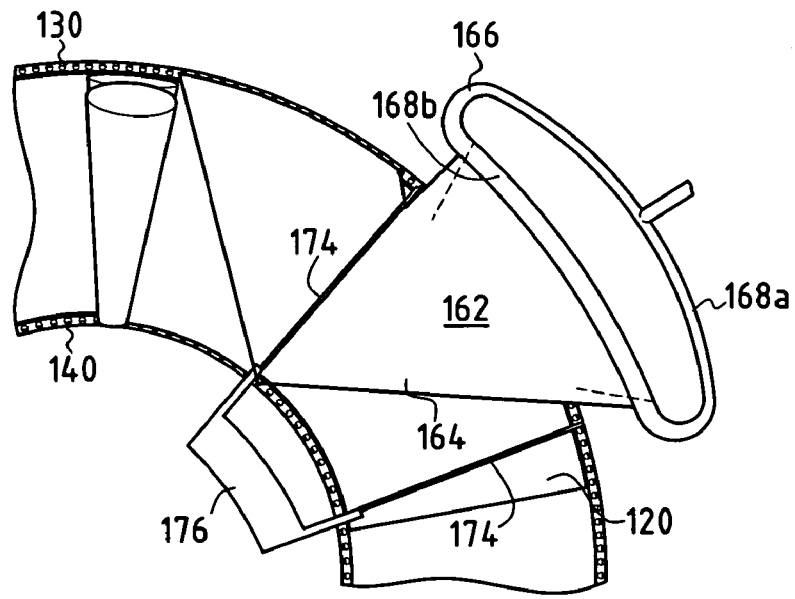
FIG. 5 is a fragmentary plan view showing diagrammatically how a transverse sheet made up of a spread tow is lapped on the sheet of longitudinal yarns.
Figure 6:
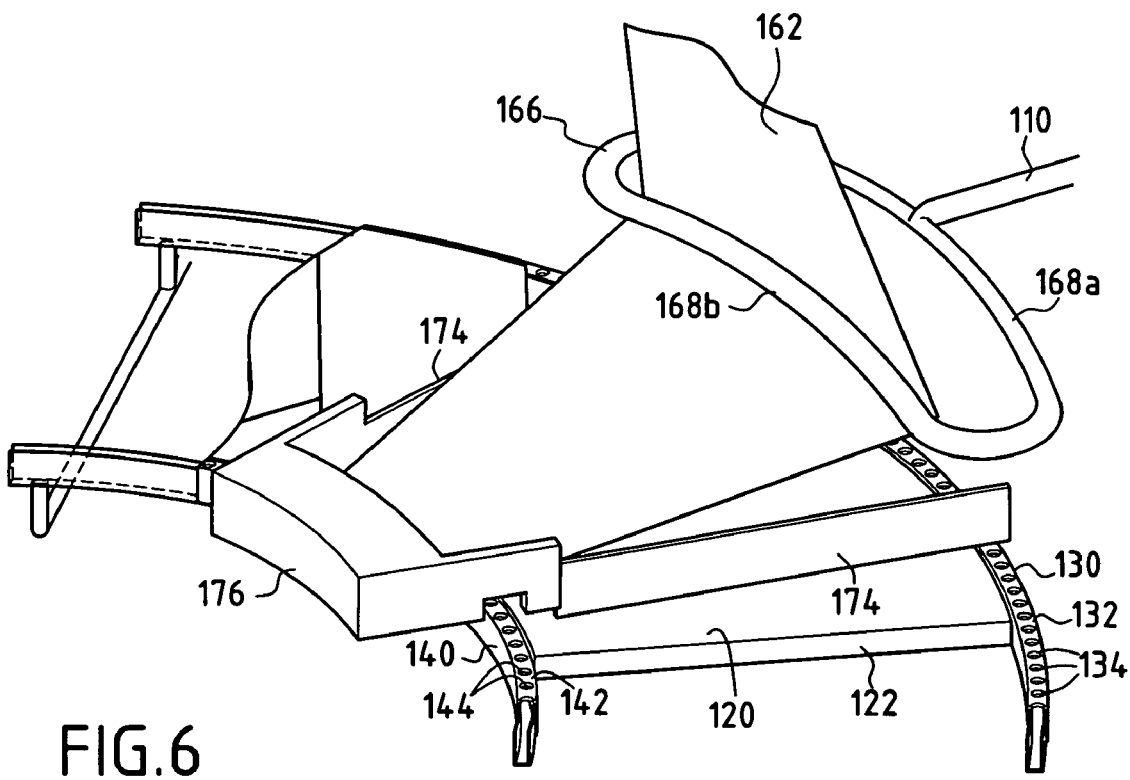
FIG. 6 is a fragmentary perspective view in greater detail showing how the transverse sheet of FIG. 7 is lapped.

FIGS. 5 and 6 show a variant embodiment of a transverse sheet 162 made by lapping a spread tow 164. For this purpose, it is possible to use a tow of high weight, e.g. a 300K, 320K, or 400K carbon tow. The tow may be spread out in well-known manner by being passed over at least one curved roller (or "banana" roller), not shown, with spreading possibly being assisted by exposure to a jet of air, as described for example in document PCT/FR02/02249. It is possible to juxtapose a plurality of spread tows in order to obtain a sheet of greater width.

The spread tow 164 passes through a guide frame 166 analogous to the above-described frame 106, having two curves bars 168a and 168b. On its path between the outer and inner rings 130 and 140, the tow 164 is also guided between two stationary radial blades 174 carried by a strip 176 on the inner side.

The guide frame 166 is moved radially back and forth. While it is moving radially inwards, it contributes by means of its bar 168a and in co-operation with the stationary guide blades 174 to cause the transverse sheet 162 to become narrower between the rings 130 and 140 so as to give it the shape of a annular sector. While it is moving radially outwards, the guide frame 166 contributes, by means of its bar 168b co-operating with the blades 174, to widening the transverse sheet 162 again. The transverse sheet is held where it reverses direction by suction against the rings 130 and 140.

Forming the Helical Longitudinal Sheet

The helical longitudinal sheet 202 comprises a plurality of mutually parallel longitudinal (or circumferential) yarns or tows 204 that are drawn from respective bobbins carried by a creel (not shown). In the description below, the elements 204 are referred to as "yarns" for reasons of simplicity. The longitudinal sheet 202 extends over a width that substantially equal to the width of the helical two-dimensional sheet that is to be made.

In one embodiment (FIGS. 1, 2, and 7), the longitudinal yarns 204 are of the same weight and they are disposed with spacing between adjacent yarns that decreases between the inner longitudinal edge 202a of the longitudinal sheet (corresponding to the inside circumference of the helical two-dimensional sheet that is to be made) and the opposite outer longitudinal edge 202b. The spacing between the yarns of the longitudinal sheet is advantageously varied so that after assembly with the transverse sheet, a density per unit area is obtained for the helical two-dimensional sheet that is substantially constant across the width thereof.

Figure 8:
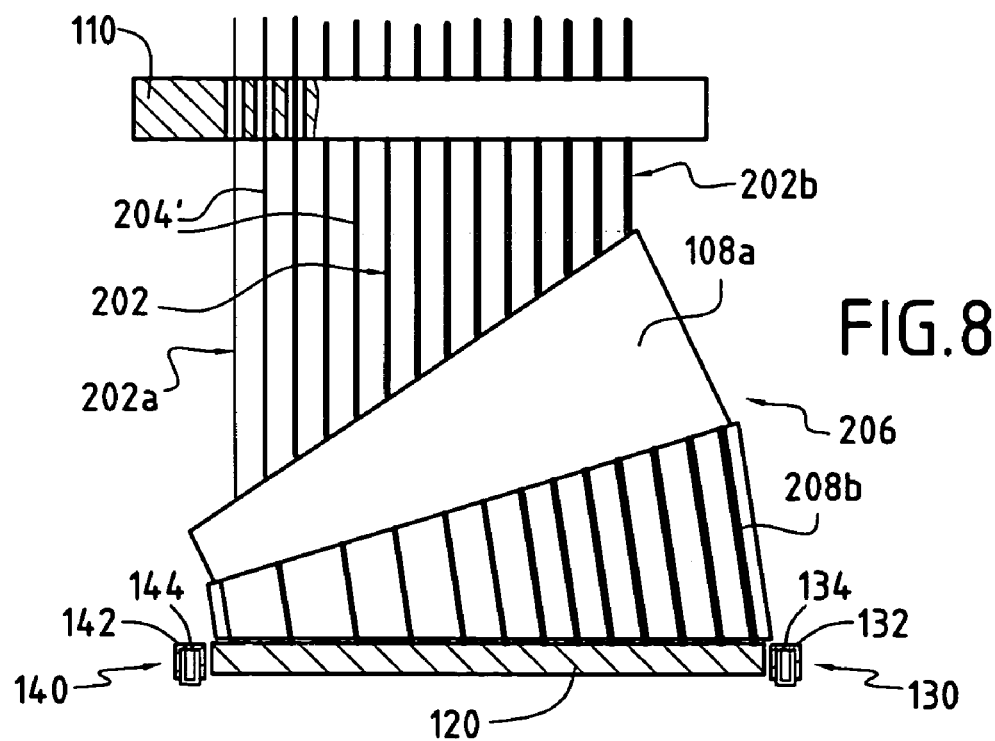
FIG. 8 shows a variant way of making up the sheet of longitudinal yarns.

In another embodiment (FIG. 8), longitudinal yarns 204' are used that are of differing weight, and that are disposed with constant spacing between adjacent yarns. The weight of the yarns varies, increasing from the inner edge 202a to the outer edge 202b of the sheet 202. The way in which weight varies is advantageously determined so that after assembly with the transverse yarns, density per surface area is obtained for the helical two-dimensional sheet that is substantially constant over the width thereof.

Naturally, it would also be possible to combine varying the spacing between the longitudinal yarns with varying the weights thereof.

The yarns 204 are of a kind similar to that of the yarns 104.

The yarns 204 are fed (FIGS. 1, 2, and 7) by means of a press 206 formed by two conical rollers 208a, 208b that press against each other. At least one of the rollers 208a, 208b is rotated to pull the yarns 204. The yarns 204 pass successively over the upper roller 208a, between the upper roller and the lower roller 208b, and then over the lower roller. The yarns 204 are delivered by the lower roller 208b onto the transverse sheet that has been lapped on the horizontal support plate 120.

In order to impart the desired spacing between the yarns 204 of the sheet 202, they are passed over a spreader bar 110 (FIG. 7) upstream from the press 206. Each yarn 204 passes through the bar 210 in a respective guide, e.g. an orifice made therein, a gap between two parts carried by the bar 210, or indeed a groove formed in the bar. Other means may be provided for adjusting the spacing between the yarns 204, e.g. a comb.

The increase in the density per unit area of the transverse sheet 102 or 162 between the outer edge and the inner edge of the plate 120 is compensated by varying the density of the longitudinal sheet in the radial direction so as to obtain a two-dimensional helical sheet of density per unit area that is substantially uniform.

Assembling the Longitudinal and Transverse Sheets Together

The assembly that is displaced continuously and that is formed by the transverse sheet as lapped and by the longitudinal sheet is brought to the assembly device 300.

Figure 9:
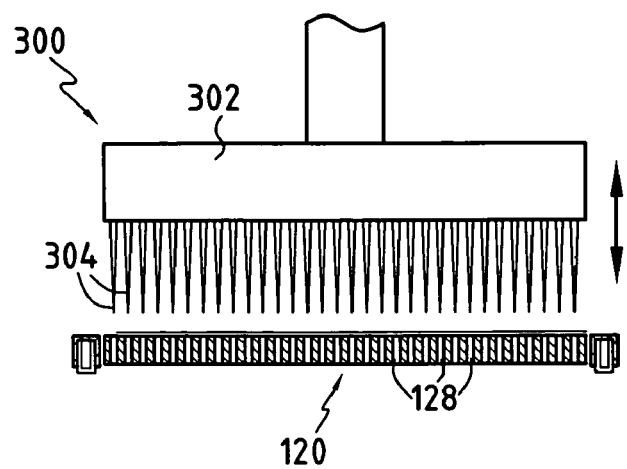
FIG. 9 is a fragmentary view in section on plane IX of FIG. 1 showing how the longitudinal and transverse sheets are assembled together.

In the example shown (FIGS. 1, 2, 9) the assembly device comprises a needling head 302 generally in the shape of a annular sector and extending between the edges of the support plate 120, above it. The head 302 carries a plurality of needles 304 that are uniformly distributed and it is driven with vertical reciprocating motion under drive from a crank type drive member (not shown). The support plate 120 presents perforations 128 in register with the needles 304 so as to enable them to penetrate through the plate without being damaged.

The needles 304 pass through the sheet 202 and 102 (or 162) bonding them together by tangling filaments from the yarns 204 and 104 (or from the yarns 204 and the tow 164).

It should be observed that bonding two fiber sheets together by needling is well known in itself.

Suction at the edges of the lapped transverse sheet at the rings 130 and 140 is maintained until the longitudinal and transverse sheets have been assembled together sufficiently, for example at least halfway along the annular sector occupied by the needling head.

The helical longitudinal sheet 202 is preferably deposited on the lapped transverse sheet 102 as close as possible to the upstream end of the assembly device 300, i.e. immediately prior to the sheets being assembled together, so as to avoid possible displacement of the yarns 204 in a radial direction, i.e. so as to conserve the relative positions of said yarns in the sheet 202 since prior to assembly, the yarns 204 are not held in place.

Nevertheless, it would also be possible to begin by depositing the longitudinal sheet 202 and then lap the transverse sheet 102 on the sheet 202 on the plate 120.

The longitudinal and transverse sheets may be assembled together in ways other than by needling.

Thus, it is possible to perform assembly by stitching with a bonding thread. The assembly device then comprises a stitching head disposed radially, or a plurality of stitching heads spaced apart from one another across the width of the longitudinal sheet.

It is also possible to place hot-melt yarns on the transverse sheet prior to depositing the longitudinal sheet, with the assembly device then comprising means for heating the hot-melt yarns inserted between the sheets.

Removing the Two-dimensional Helical Sheet

The helical two-dimensional sheet 402 obtained at the outlet from the assembly device is pulled by the conical rollers 412a and 412b and is wound continuously into an annular drum 420 situated beneath the support plate 120 and having the same axis as the support plate (FIG. 1).

The plate 120 in the form of a annular sector has a downstream end 124 situated between the assembly device 300 and the puller device 410. Its upstream end 122 is preferably situated upstream from the device 100 for lapping the sheet 102.

The annular drum 420 receives the sheet 402 which drops therein under gravity on leaving the puller device 410. The sheet 402 is wound in the drum 420 as successive turns which are superposed flat by the drum 420 rotating synchronously with the advance of the sheet 402 on the support plate 120.

To this end, the drum 420 may be mounted on a turntable 422 driven by a drive roller or gear 424 mounted on a vertical drive shaft 426. The shaft may also carry a drive roller or gear 428 for driving the outer ring 130. The turntable 422 presents an axial rod 430 connected to the inner ring 140 by arms 432. Thus, the annular drum 420, the outer ring 130, and the inner ring 140 are rotated together synchronously. The outer ring 130 is supported by bearings (not shown) on which the vertical flanges of the ring are supported either by friction or via rolling bearings.

Other Embodiments

Figure 10:
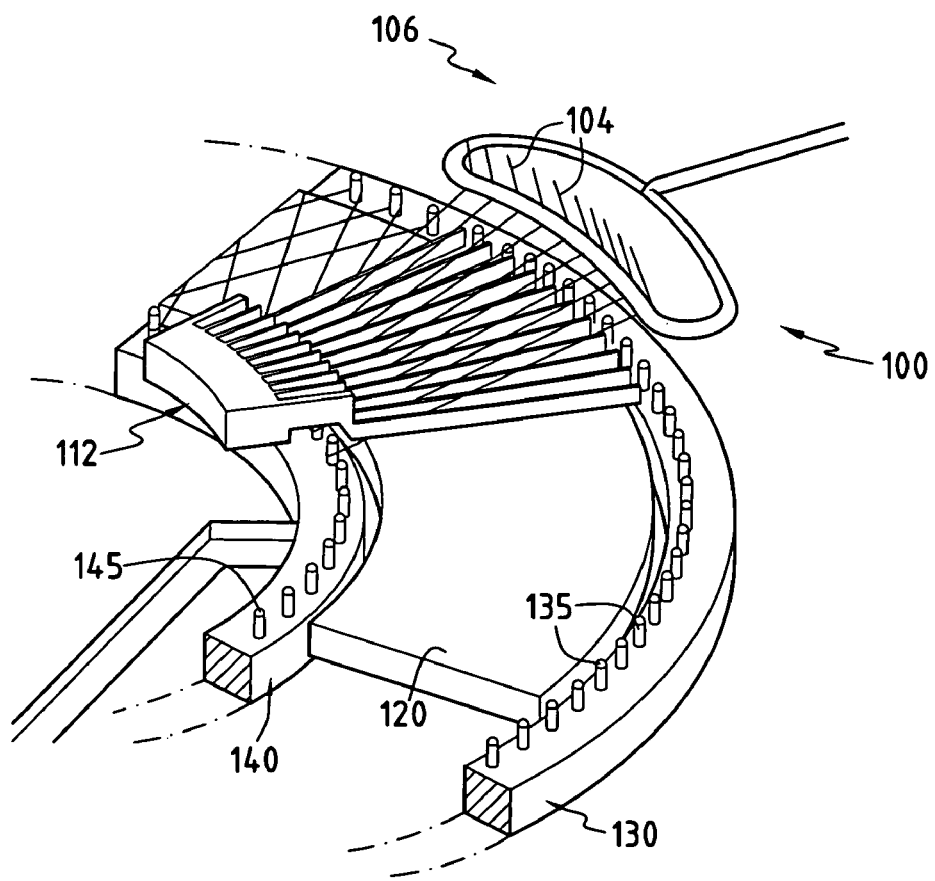
FIG. 10 is a view similar to that of FIG. 5 showing another way of holding the transverse yarns at the edges of the sheet of longitudinal yarns.
Figure 11:
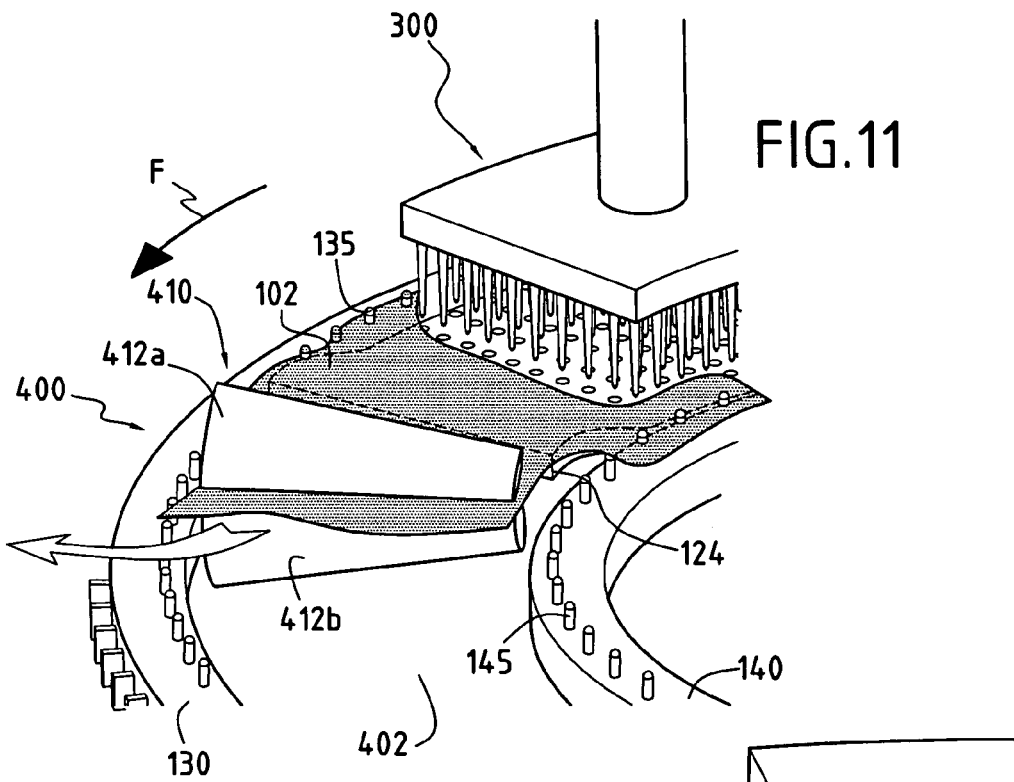
FIG. 11 is a diagrammatic fragmentary perspective view showing how the helical two-dimensional sheet is removed in the embodiment of FIG. 10.

FIGS. 10 and 11 show an embodiment which differs from that of FIGS. 1 to 3 and 7, 8 in particular in that the transverse sheet is held where its yarns change direction on either side of the support plate 120 by the yarns passing around vertical pegs 135, 145 carried by the rings 130, 140 (FIG. 10).

The rings are then constituted merely by annular bands without perforations and without associated suction means.

On leaving the assembly device 300 (FIG. 11), the resulting helical two-dimensional sheet 402 is separated from the pegs 135, 145 by being raised vertically upwards. For this purpose, the tangential line between the rollers 412a and 412b of the puller device 410 is situated above the top end of the pegs. Separation of the sheet 402 may also be assisted by curving the downstream end portion 124 of the support plate 120 upwards. The sheet 102 may be collected in an annular drum, as in FIG. 1, preferably with the edges of the sheet being guided until they are beneath the plane of the rings 130, 140 so as to avoid interference with the pegs 135, 145 after it has been separated therefrom.

Figure 12:
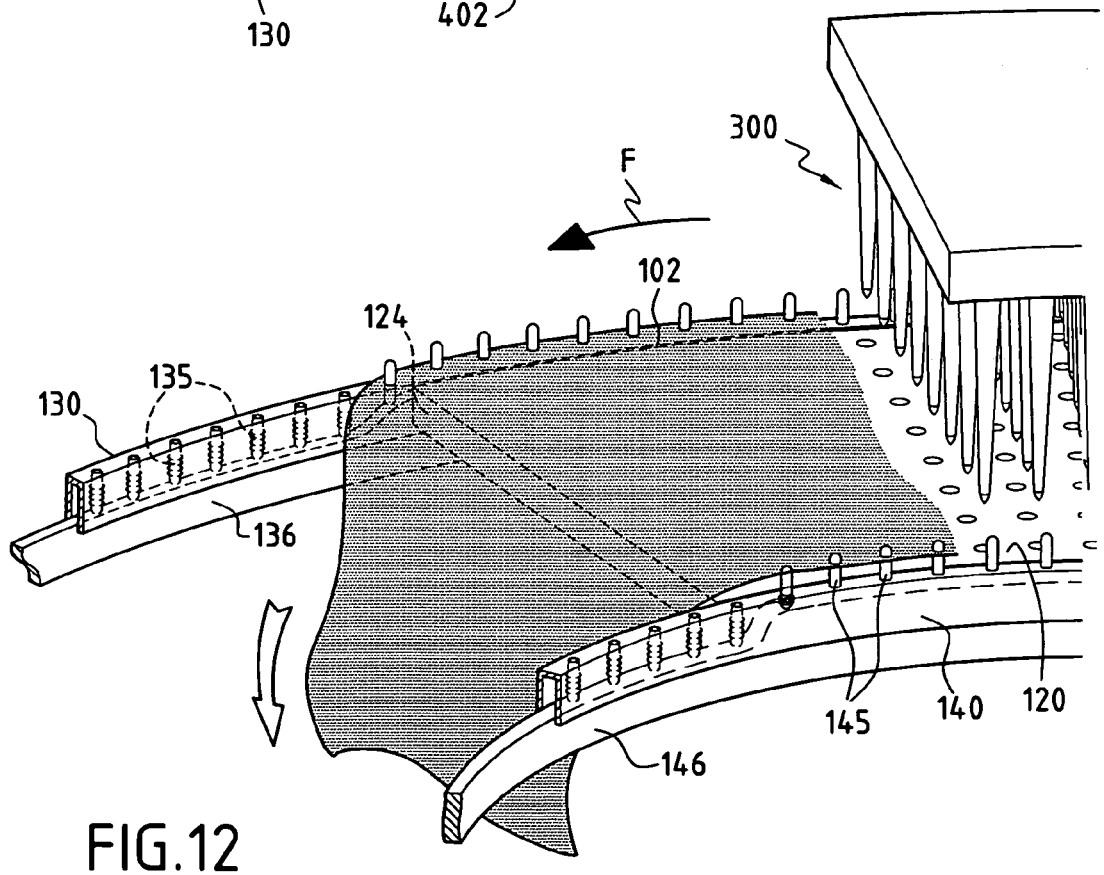
FIG. 12 is a highly diagrammatic and fragmentary view showing a variant of the embodiment of FIGS. 10 and 11.
Figure 16:
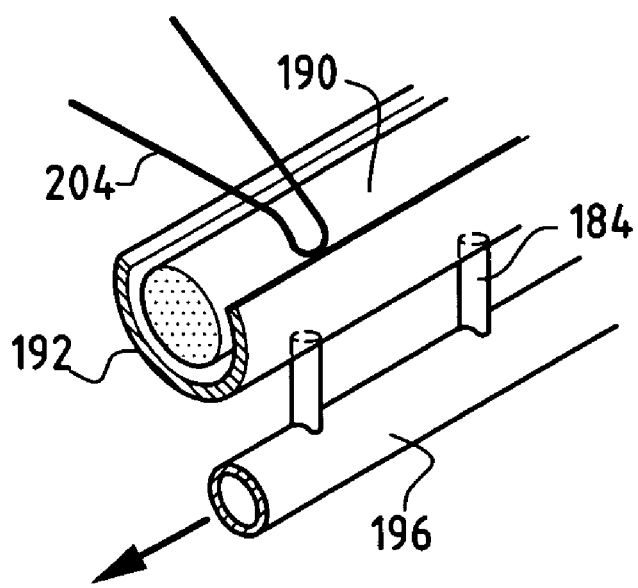
FIG. 16 is a detail view showing how the transverse yarns are held at the edges of the longitudinal sheet in the installation of FIG. 13.

In a variant (FIG. 12), use is made of pegs 135, 145 that are vertically retractable. The pegs pass vertically through the rings 130, 140 and their bottom ends are pressed against stationary cam paths 136, 146. The cam paths 136, 146 are shaped in such a manner as to allow the pegs to be retracted downwards as soon as they leave the assembly device 300, and enable the pegs to be raised subsequently on entering the upstream end of the lapping device 100. It is then not necessary for the sheet 402 to be moved upwards in order to be separated from the pegs for removal purposes.

Figure 2:
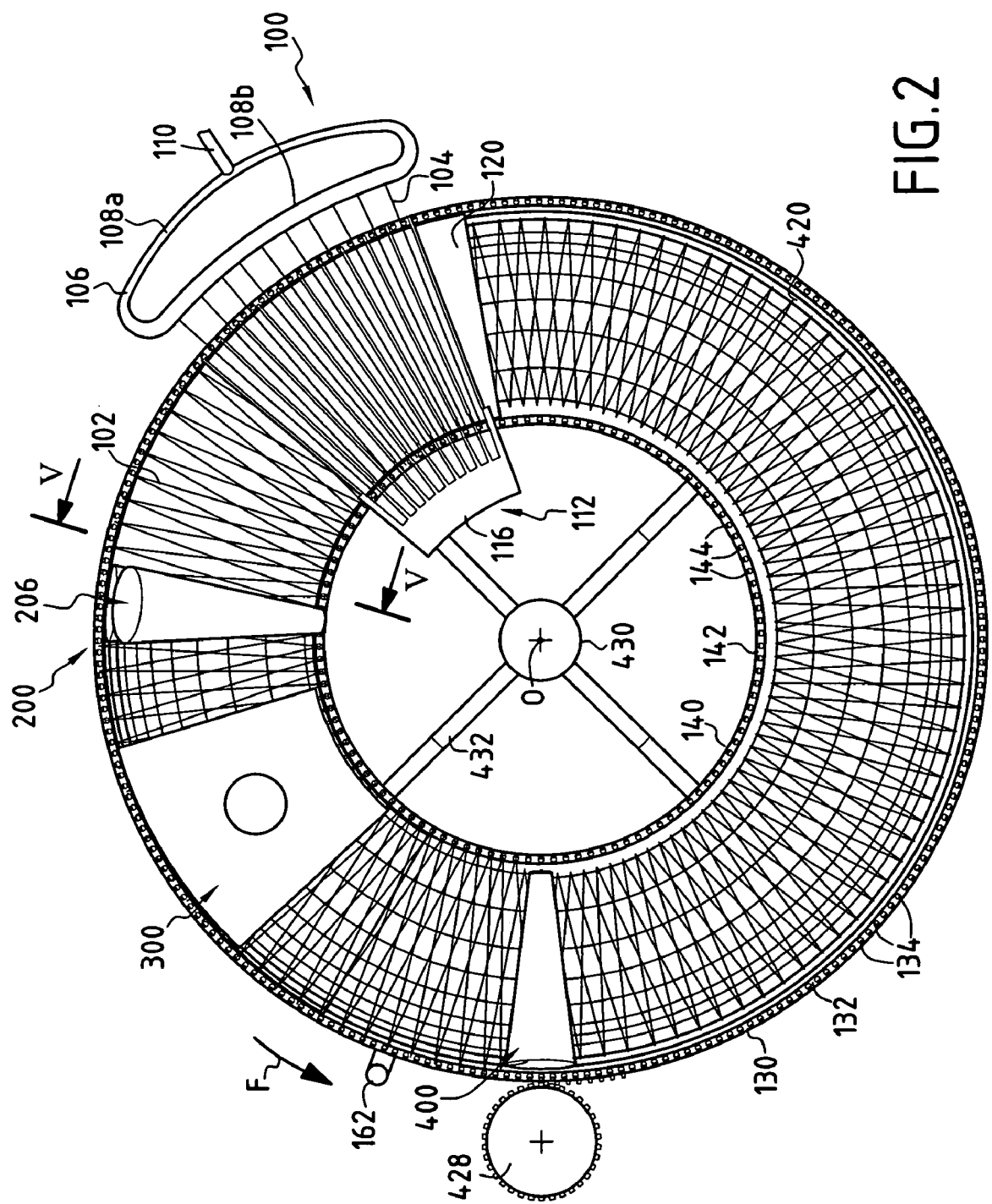
FIG. 2 is a highly diagrammatic plan view of the FIG. 1 installation.

FIGS. 13 to 16 show another embodiment which differs from that of FIGS. 1 to 3 specifically in the way the transverse sheet is lapped and the way in which the lapped transverse sheet is driven.

Each transverse yarn 104 forming the sheet 102 passes through a yarn guide 280 such as an eyelet moved back and forth in a radial direction between the inner and outer edges 120a and 120b of the support plate 120. Each yarn guide 280 is secured to a support 282 that is guided along a horizontal radial rod 284. The support 282 is secured to a cord 286 which is looped at the end of the rod 284 by passing over a driving pulley 288 and a deflector pulley 290. The pulley 288 is driven alternatively in one direction and in the opposite direction by means of a motor (not shown). Other means for driving the support 282 could be provided, e.g. actuator rods.

In the figures, only some of the transverse yarns and their associated feeder means are shown in order to clarify the drawings.

Each transverse yarn 104 is held on either side of the plate 120 by pressing against respective belts 180, 190. The belts 180, 190 are guided in horizontal slideways 182, 192 extending along and beyond the edges 120a and 120b of the support plate 120. In its bottom, each slideway 182, 192 presents one or more slots or a plurality of holes connected via couplings 184 to pipes 186, 196 connected to a vacuum source (not shown). The pipes 186, 196 extend beneath the devices 100 and 200 for feeding the transverse and longitudinal sheets, and also beneath at least a part of the assembly device 300.

The belts 180 and 190 are endless belts following respective horizontal paths in the slideways 182, 192 between the upstream and downstream ends 122 and 124 of the support plate 120.

The belt 180 passes over a drive wheel 181 and a deflector wheel 183 situated respectively upstream and downstream from the ends 122, 124 of the support plate 120, and beneath the plane thereof. The belt 180 is guided by a curved horizontal slideway 188 (FIG. 15) along its return path between the reels 181 and 183, passing under the pipe 186. Similarly, the belt 190 passes over a drive wheel 191 and a deflector wheel 193 situated upstream and downstream from the ends 122 and 124 of the support plate 120, beneath the plane thereof. The belt 190 is guided by a curved horizontal slideway 198 along its return path between the drive and deflector wheels, passing beneath the pipe 196.

The drive wheels 181, 191 are coupled to respective motors 181a and 191a so as to move the belts 180 and 190 in the slideways 182, 192 synchronously with the yarns that are being moved on the support plate 120. It should be observed that the bottom slideways 188, 198 are disposed substantially parallel to and vertically beneath the top slideways 182, 192. Thus, under the combined effect of the belts 180 and 190 advancing and the yarn guides 280 being driven, each transverse yarn 104 follows a zigzag path between the top strands of the belts 180, 190, and each time it reverses directly it is held pressed onto one of the belts 180, 190 by the suction that is established in the slideways 182, 192.

Figure 17:
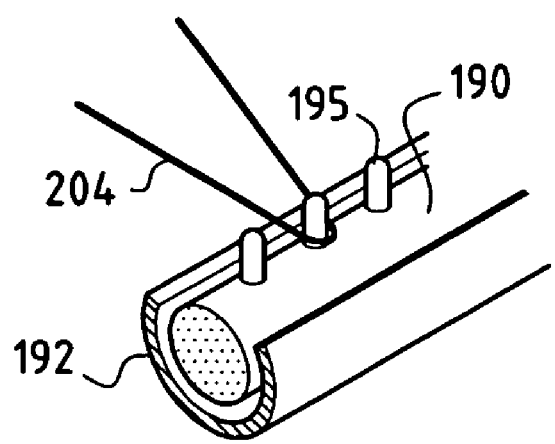
FIG. 17 is a detail view showing another way of holding the transverse yarns at the edges of the longitudinal sheet in the installation of FIG. 13.

In a variant embodiment (FIG. 17), each transverse yarn 104 is held on either side of the support plate 120 by means of pegs such as 195 carried by the belts 180, 190. At each of its stroke, each yarn guide 280 is guided to a reversal point situated slightly beyond the belt such that by the belt advancing the transverse yarn is caused to make a turn around a peg carried by the belt. Each transverse yarn is thus held by the pegs without any need for suction, such that the slideways 182, 192 do not have any slots or holes and there is no need for a vacuum source.

In the above, it is assumed that a stationary support plate is used that is in the form of a annular sector and that has a smooth surface.

Figure 18:
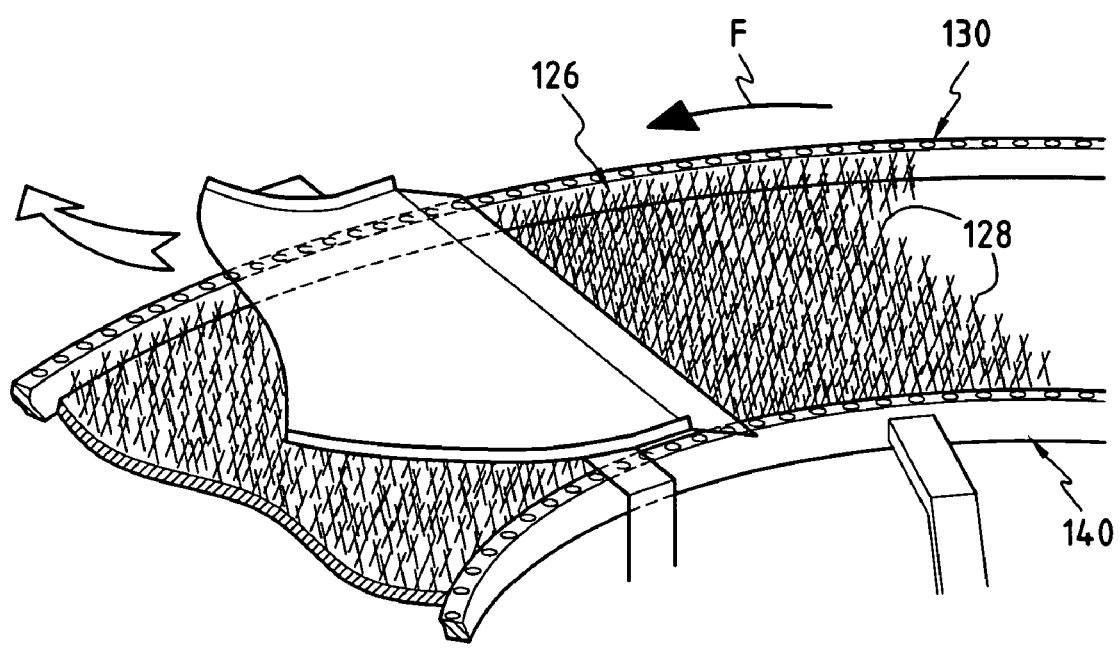
FIG. 18 is a diagrammatic overall view in perspective of another embodiment of an installation enabling a method of the invention to be implemented.

In a variant, it is possible to use a rotary support plate 126 having a top portion in the form of a brush having rigid bristles 128, as shown in FIG. 18, the devices 100, 200, and 300 for lapping the transverse sheet, for depositing the circumferential longitudinal sheet, and for assembling the two sheets together being, for example, the same as those described with reference FIGS. 1 to 3 and 7, 8.

The plate 126 forms a complete annulus which is rotated together with the rings 130, 140, e.g. being secured thereto. The rigid bristles 128 provide effective retention of the longitudinal yarns 204 so that the longitudinal sheet can be deposited onto the support plate 124 prior to the transverse sheet without any fear of the longitudinal yarns moving radially prior to the sheets being assembled together. In addition, the rigid bristles 128 allow the needles to penetrate without damage to the rotary support if the sheets are assembled together by needling.

At the outlet from the assembly device 300, the helical two-dimensional sheet 402 is separated from the support plate 126 in an upward direction and it is removed laterally away from the support plate by being taken up by conical rollers (not shown).

It should be observed that the rings 130 and 140 could be omitted if the rigid bristles 128 of the plate 126 are capable of effectively holding the yarns 104 of the transverse sheet once they have been lapped. This can be the case when the yarns 104 are lapped radially while also being moved vertically at each end of the radial stroke so as to engage the yarns 104 in the rigid bristles 128 of the brush that forms the top portion of the plate 126.

It should also be observed that it is possible to envisage removing the resulting helical two-dimensional sheet laterally from the other embodiments described (FIGS. 1 to 16) instead of collecting the sheet in a lower annular drum. The stationary support plate 120 in those other embodiments could then be constituted by a complete annulus.

What is claimed is:

1. A method of making a helical two-dimensional fiber sheet, the method comprising the following steps:
   bringing at least one transverse fiber sheet and lapping it while guiding it in a substantially radial direction along a path in alternating directions between inner and outer circumferential edges of the sheet, with the transverse sheet being reversed at each end of its path, the width of the transverse sheet being narrowed between the outer circumferential edge and the inner circumferential edge;
   holding the transverse sheet as it is lapped;

pulling a plurality of substantially mutually parallel yarns or tows to form a helical longitudinal sheet with the density per unit area of the longitudinal sheet decreasing from its longitudinally outer edge to its longitudinally inner edge;

superposing the helical longitudinal and transverse sheets and advancing them flat in continuous rotation;

assembling together the lapped transverse sheet and the longitudinal sheet to form a helical two-dimensional sheet; and removing the helical two-dimensional sheet formed in this way.

2. A method according to claim 1, wherein the longitudinal sheet is brought onto the lapped transverse sheet immediately prior to the sheet being assembled together.

3. A method according to claim 1, wherein the transverse sheet is formed by a plurality of yarns or tows.

4. A method according to claim 1, wherein the transverse sheet is formed by at least one spread tow.

5. A method according to claim 1, wherein, while the transverse sheet is being lapped it is guided by passing over a guide so as to encourage narrowing of the sheet while the guide is moving from the outer edge towards the inner edge of the sheet, and vice versa.

6. A method according to claim 5, wherein the guide comprises two curved bars against which the transverse sheet bears in alternation while the guide is being moved in one direction and in the opposite direction between the outer and inner edges of the sheet.

7. A method according to claim 3, wherein, while the transverse sheet is being lapped it is guided by passing over a guide so as to encourage narrowing of the sheet while the guide is moving from the outer edge towards the inner edge of the sheet, and vice versa, and wherein each yarn or tow is also guided between fixed guide elements extending substantially radially between the outer and inner circumferential edges of the sheet.

8. A method according to claim 4, wherein, while the transverse sheet is being lapped it is guided by passing over a guide so as to encourage narrowing of the sheet while the guide is moving from the outer edge towards the inner edge of the sheet, and vice versa, and wherein the spread tow(s) are also guided between two stationary guide elements extending substantially radially between the outer and inner circumferential edges of the sheet.

9. A method according to claim 3, wherein each yarn or tow of the transverse sheet is guided by passing through a respective yarn guide that is moved between the outer and inner circumferential edges of the sheet.

10. A method according to claim 1, wherein, after lapping, the transverse sheet is held, where it reverses, on supports situated along the outer and inner edges of the sheet, which supports are moved synchronously with the advance of the lapped transverse sheet and of the longitudinal sheet.

11. A method according to claim 10, wherein holding is provided by being sucked onto said supports.

12. A method according to claim 10, wherein holding is provided by passing around pegs carried by said supports.

13. A method according to claim 1, wherein the density per unit area of the longitudinal sheet is varied by using yarns or tows of different weights and/or by varying the spacing between the yarns or tows.

14. A method according to claim 1, wherein the longitudinal yarns or tows are pulled by passing them through a press comprising two conical rollers pressing against each other.

15. A method according to claim 1, wherein the longitudinal sheet and the lapped transverse sheet are assembled together by needling.

16. A method according to claim 1, wherein the longitudinal sheet and the lapped transverse sheet are assembled together by stitching using a bonding yarn.

17. A method according to claim 1, wherein the longitudinal sheet and the lapped transverse sheet are assembled together by interposing hot-melt yarns.

18. A method according to claim 1, wherein the transverse sheet and the longitudinal sheet are fed onto a stationary annular support plate.

19. A method according to claim 18, wherein the support plate is in the form of a annular sector, having a downstream end situated downstream in the advance direction from an assembly zone in which the longitudinal and transverse sheets are assembled together, and the helical two-dimensional sheet is removed at an outlet from the annular support plate situated at its downstream end.

20. A method according to claim 19, wherein the helical two-dimensional sheet is wound helically as flat superposed turns in a rotary annular storage drum situated beneath the annular support plate and having substantially the same axis as the support plate.

21. A method according to claim 1, wherein the transverse and longitudinal sheets are fed onto a rotary annular support plate.

22. A method according to claim 21, wherein the helical two-dimensional sheet is removed laterally from the annular support plate.

23. An installation for fabricating a helical two-dimensional fiber sheet, the installation comprising:

an annular support plate;

a feed and transverse lapping device for moving a fiber sheet transversely along a back-and-forth path from one side to the other of the annular support plate with the transverse sheet being reversed at each end of the path and with the sheet being guided in a substantially radial direction;

means for holding the lapped transverse sheet;

a device for pulling a set of yarns or tows to form a helical longitudinal sheet and for feeding it onto the annular support plate;

a device for assembling together the lapped transverse sheet and the longitudinal sheet to form a helical two-dimensional sheet;

means for continuously advancing the lapped transverse sheet and the longitudinal sheet in flat rotation on the annular support plate; and means for removing the helical two-dimensional sheet after the longitudinal and transverse sheets have been assembled together.

24. An installation according to claim 23, wherein the device for feeding and lapping the transverse sheet comprises a guide over which the transverse sheet passes, and means for driving the guide in reciprocating motion along a substantially radial path between the sides of the annular support plate, the guide being made in such a manner as to encourage narrowing of the transverse sheet while the guide is moving from the outside of the annular plate towards the inside, and vice versa.

25. An installation according to claim 24, wherein the guide comprises two curved bars against which the transverse sheet bears in alternation when the guide is moved in one direction and in the other direction between the outer and inner sides of the annular plate.

26. An installation according to claim 24, wherein, in order to feed and lap a transverse sheet formed by a plurality of transverse yarns or tows, the feeding and lapping device further comprises a plurality of stationary guide elements disposed radially between the outer and inner sides of the annular plate and co-operating with the transverse yarns or tows to guide each of them on its path between the outer side and the inner side of the annular support plate.

27. An installation according to claim 24, wherein, in order to feed and lap a transverse sheet formed by at least one spread tow, the feeding and lapping device further comprises two stationary guide elements disposed radially between the outer and inner sides of the annular support plate, and between which the transverse sheet is guided on its path between the outer side and the inner side of the annular support plate.

28. An installation according to claim 23, wherein, in order to feed and lap a transverse sheet formed by a plurality of transverse yarns or tows, the feeding and lapping device comprises a plurality of yarn guides each associated with a respective transverse yarn or tow, and means for displacing the yarn guides back and forth along substantially radial paths between the outer and inner sides of the annular support plate.

29. An installation according to claim 23, wherein the means for holding the lapped transverse sheet comprise supports in the form of bands or rings situated on either side of the annular support plate, holding means for holding the transverse sheet on said support where the sheet reverses, and means for driving said supports synchronously with the advance means.

30. An installation according to claim 29, wherein the holding means comprise a suction chamber associated with the supports in the form of bands or rings in order to hold the transverse sheet thereagainst by suction.

31. An installation according to claim 29, wherein the holding means comprise pegs carried by supports in the form of bands, so as to enable the transverse sheet to be reversed around the pegs.

32. An installation according to claim 23, wherein the device for pulling the longitudinal sheet comprises a press formed by two conical rollers with the yarns or tows forming the longitudinal sheet passing between them.

33. An installation according to claim 23, wherein the device for assembling together the longitudinal sheet and the lapped transverse sheet is a needling device comprising at least one needling head and extending over an annular sector above the annular support plate.

34. An installation according to claim 33, wherein the annular support is stationary and is provided with perforations in register with the needles of the needling device.

35. An installation according to claim 23, wherein the device for assembling the longitudinal sheet and the lapped transverse sheet together comprise at least one stitching head for assembling the sheets together by means of a bonding yarn.

36. An installation according to claim 23, wherein the advance means comprise drive means for driving the helical two-dimensional sheet in the advance direction, the drive means being located downstream from the assembly device.

37. An installation according to claim 23, wherein the annular support plate is stationary and extends over an annular sector having a downstream end in the advance direction of the longitudinal sheet and the lapped transverse sheet, said downstream end being situated downstream from the device for assembling the sheets together.

38. An installation according to claim 37, wherein the means for removing the helical two-dimensional sheet comprise an annular drum situated beneath the annular support plate and having substantially the same axis as the support plate, and means for driving the annular drum synchronously with the advance means so that the helical two-dimensional sheet leaving the annular support plate from its downstream end is continuously collected and wound in the drum.

39. An installation according to claim 23, wherein the annular support plate is a rotary plate.

40. An installation according to claim 39, wherein the annular support plate has a top portion forming a brush with rigid bristles.

* * * * *